(12) United States Patent
Shibuya et al.

(10) Patent No.: US 9,221,490 B2
(45) Date of Patent: Dec. 29, 2015

(54) VEHICLE STEERING CONTROL APPARATUS AND STEERING CONTROL METHOD

(71) Applicant: NISSAN MOTOR CO., LTD., Yokohama-shi, Kanagawa (JP)

(72) Inventors: Masaki Shibuya, Atsugi (JP); Noriki Kubokawa, Atsugi (JP); Shogo Miyasaka, Zama (JP); Takuya Narasaki, Atsugi (JP); Yukinobu Matsushita, Isehara (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 14/398,877

(22) PCT Filed: May 15, 2013

(86) PCT No.: PCT/JP2013/003106
§ 371 (c)(1),
(2) Date: Nov. 4, 2014

(87) PCT Pub. No.: WO2013/172026
PCT Pub. Date: Nov. 21, 2013

(65) Prior Publication Data
US 2015/0134205 A1    May 14, 2015

(30) Foreign Application Priority Data
May 16, 2012  (JP) .................. 2012-112621

(51) Int. Cl.
*B62D 6/00*   (2006.01)
*B62D 11/00*  (2006.01)
(Continued)

(52) U.S. Cl.
CPC .............. *B62D 5/0463* (2013.01); *B62D 5/003* (2013.01); *B62D 5/0478* (2013.01);
(Continued)

(58) Field of Classification Search
CPC ...... B62D 5/0469; B62D 1/163; B62D 5/001; B62D 5/008; B62D 7/09; B62D 1/20; B62D 5/02; B62D 5/0421; B62D 6/10; B62D 15/02; B62D 5/065; B62D 1/18; B62D 33/02; B62D 1/185; B62D 3/12; B62D 5/12; B62D 5/30; B62D 7/148; B62D 7/159; B60W 20/1062; B60W 10/10; B60W 20/10; B60W 10/11; B60W 20/40
USPC ............. 701/41, 42, 51, 54, 22, 68, 104, 110, 701/67, 93, 36, 37, 23, 43, 45, 48, 53, 71; 180/65.265, 65.21, 65.1, 65.28
See application file for complete search history.

(56) References Cited

U.S. PATENT DOCUMENTS 4,754,830 A * 7/1988 Morishita ............ B62D 5/0463
                                              180/446
5,563,790 A * 10/1996 Wada .................. B62D 5/0436
                                              180/446
(Continued)

FOREIGN PATENT DOCUMENTS

| JP | 2007118930 A | 5/2007 |
| JP | 2007308098 A | 11/2007 |
| JP | 2010221918 A | 10/2010 |

*Primary Examiner* — Calvin Cheung
*Assistant Examiner* — Luis A Martinez Borrero
(74) *Attorney, Agent, or Firm* — Young Basile

(57) ABSTRACT

A vehicle steering control apparatus and vehicle steering control method make it possible to suppress a steering state of a steering operation element from being different from the driver's intention, in starting the driving source. A backup clutch, which is switchable between a release state where a torque transmission path is mechanically decoupled and an engagement state where the torque transmission path is mechanically coupled, is set to the engagement state in starting the engine. When the steering torque detected after the engine starts becomes equal to or lower than a clutch release start torque, the backup clutch in the engagement state is switched to the release state.

7 Claims, 6 Drawing Sheets

(51) Int. Cl.
    *B62D 12/00* (2006.01)
    *B63G 8/20* (2006.01)
    *B63H 25/04* (2006.01)
    *G05D 1/00* (2006.01)
    *G06F 7/00* (2006.01)
    *G06F 17/00* (2006.01)
    *G06F 19/00* (2011.01)
    *A01B 69/00* (2006.01)
    *B62D 5/04* (2006.01)
    *B62D 5/00* (2006.01)
    *B62D 6/04* (2006.01)
    *B62D 6/10* (2006.01)

(52) U.S. Cl.
    CPC .............. *B62D 5/0484* (2013.01); *B62D 6/002* (2013.01); *B62D 6/04* (2013.01); *B62D 6/10* (2013.01)

(56) References Cited

U.S. PATENT DOCUMENTS

| | | | | |
|---|---|---|---|---|
| 7,049,773 B2* | 5/2006 | Miyazawa | ............ | B62D 5/049 318/432 |
| 7,272,478 B2* | 9/2007 | Tamai | ................ | B62D 5/0472 180/422 |
| 7,810,605 B2* | 10/2010 | Kasahara | .............. | B62D 5/003 180/402 |
| 8,068,954 B2* | 11/2011 | Higashi | ................ | B62D 5/003 701/43 |
| 8,306,683 B2* | 11/2012 | Simmons | ................ | B62D 1/28 701/23 |
| 8,688,326 B2* | 4/2014 | Rubia | ................ | B62D 15/025 318/432 |
| 8,731,775 B2* | 5/2014 | Kobayashi | ........... | B62D 5/0466 180/443 |
| 2002/0053481 A1* | 5/2002 | Itakura | ................ | B62D 5/0463 180/446 |
| 2005/0072621 A1* | 4/2005 | Hara | ..................... | B62D 1/163 180/444 |
| 2005/0121252 A1* | 6/2005 | Tsuchiya | ............ | B62D 5/0466 180/446 |
| 2006/0200289 A1* | 9/2006 | Chino | .................... | B62D 5/003 701/41 |
| 2006/0200290 A1* | 9/2006 | Chino | .................... | B62D 5/005 701/41 |
| 2006/0278467 A1* | 12/2006 | Endo | ..................... | B62D 5/008 180/446 |
| 2007/0144815 A1* | 6/2007 | Tsutsumi | ............... | B62D 5/003 180/402 |
| 2007/0294008 A1* | 12/2007 | Yasui | ................... | B62D 5/0472 701/41 |
| 2007/0299583 A1* | 12/2007 | Fujita | ................... | B60T 8/1755 701/41 |
| 2008/0183354 A1* | 7/2008 | Higashi | ................ | B62D 5/003 701/43 |
| 2008/0185213 A1* | 8/2008 | Mori | ..................... | B62D 5/003 180/402 |
| 2010/0056326 A1* | 3/2010 | Kahn | ..................... | B60K 6/48 477/3 |
| 2011/0022268 A1* | 1/2011 | Kojo | ..................... | B62D 5/003 701/41 |
| 2011/0093167 A1* | 4/2011 | Williams | ............... | B62D 5/065 701/41 |
| 2012/0055731 A1* | 3/2012 | Lee | ....................... | B62D 6/007 180/446 |
| 2012/0101687 A1* | 4/2012 | Svensson | ............. | B62D 5/0472 701/42 |
| 2013/0060426 A1* | 3/2013 | Watanabe | ............ | B62D 5/0463 701/42 |
| 2013/0073146 A1* | 3/2013 | Konomi | ................ | B62D 5/0472 701/41 |
| 2013/0075185 A1* | 3/2013 | Sugai | .................... | B62D 5/001 180/402 |
| 2013/0103264 A1* | 4/2013 | Takashima | .......... | B60W 10/184 701/42 |
| 2013/0253770 A1* | 9/2013 | Nishikawa | ............. | B62D 6/003 701/42 |

* cited by examiner

VEHICLE STEERING CONTROL APPARATUS AND STEERING CONTROL METHOD

CROSS REFERENCE TO RELATED APPLICATION

The present application claims priority to Japanese Patent Application No. 2012-112621, filed May 16, 2012, incorporated herein in its entirety.

TECHNICAL FIELD

The present disclosure relates to a vehicle steering control apparatus and a steering control method, for turning a turning wheel via a turning motor at a target turning angle in response to a vehicle driver's operation of a steering operation element, with a torque transmission path between the steering operation element and the turning wheel being mechanically decoupled.

BACKGROUND

In one technology, there is a steering control apparatus for turning the turning wheels via the turning motor at a target turning angle in response to the operation of the steering operation element (i.e., steering wheel), with the torque transmission path between the steering operation element and the turning wheels being mechanically decoupled. Such a steering control apparatus is an apparatus configuring a system (i.e., SBW system) generally called Steer By Wire (hereinafter, sometimes referred to as "SBW").

The SBW system includes a backup clutch to mechanically couple the torque transmission path at the timing of a system failure time or system off. In order to diagnose the state of the above-described backup clutch, the engagement or release of the backup clutch needs to be done frequently, but an operation sound is generated at the time of the engagement or release of the backup clutch. For this reason, for example, JP 2010-221918 A proposes a technique of starting the diagnosis of the backup clutch, when it is detected that a vehicle driver is not in the vehicle.

SUMMARY

In the technique described in JP 2010-221918 A, the backup clutch is diagnosed before the driver gets in a vehicle, the engine startup is waited for with the backup clutch being released, and the SBW control starts after the engine starts. However, when the state of waiting for the engine startup continues for a long time after the driver gets in the vehicle, the backup clutch is engaged, in some cases, for suppressing the power consumption. In this case, the backup clutch is released after the engine starts, and then the SBW control starts.

In this situation, when starting the engine while the driver is steering the steering operation element, the state where inner components such as a roller, cam, or the like are engaged with each other is maintained in the backup clutch. Hence, the release of the backup clutch becomes difficult, in some cases. When the SBW control starts in a state where the release of the backup clutch is difficult, the control of the turning motor will start in the state where the backup clutch is engaged, and the steering state of the steering operation element might be different from the driver's intention.

The present disclosure has been made in view of the above circumstances, and has an object to provide a vehicle steering control apparatus and steering control method capable of suppressing the steering state of the steering operation element from being different from the driver's intention in starting the engine.

In order to solve the above-described problem, according to an aspect of the present disclosure, the backup clutch is set to the engagement state in starting the driving source for driving a driving wheel. Then, when the steering torque detected after starting the driving source becomes equal to or lower than a predefined clutch release start torque, the backup clutch in the engagement state is switched to the release state. Herein, the steering torque is a torque to be applied to the steering shaft configuring the torque transmission path between the steering operation element operated by the driver and the turning wheels.

In addition to this, when the backup clutch is set to the engagement state, the turning assistance torque for assisting the turning of the turning wheels is output from the turning motor, in response to the operation of the steering operation element. Further, when the backup clutch in the engagement state is switched to the release state, the turning torque depending on the target turning angle is output from the turning motor, in response to the operation of the steering operation element.

According to an aspect of the present disclosure, even when starting the driving source while the driver is steering the steering operation element, as far as the steering torque that the driver applies to the steering shaft exceeds the clutch release start torque, the backup clutch is maintained in the engagement state. Then, the steering torque that the driver applies to the steering shaft becomes equal to or smaller than the clutch release start torque, the backup clutch in the engagement state is switched to the release state.

Accordingly, when the backup clutch is switched to the release state, it is possible to reduce the impact received by the driver through the driver's hand gripping the steering operation element. It is therefore possible to suppress the steering state of the steering operation element from being different from the driver's intention in starting the driving source.

DESCRIPTION OF EMBODIMENTS

Embodiments of the present disclosure will be described with reference to the accompanied drawings.

(First Embodiment)

A first embodiment (hereinafter, referred to as present embodiment) of the present disclosure will be described with reference to the drawings.

(Configuration)

Figure 1:
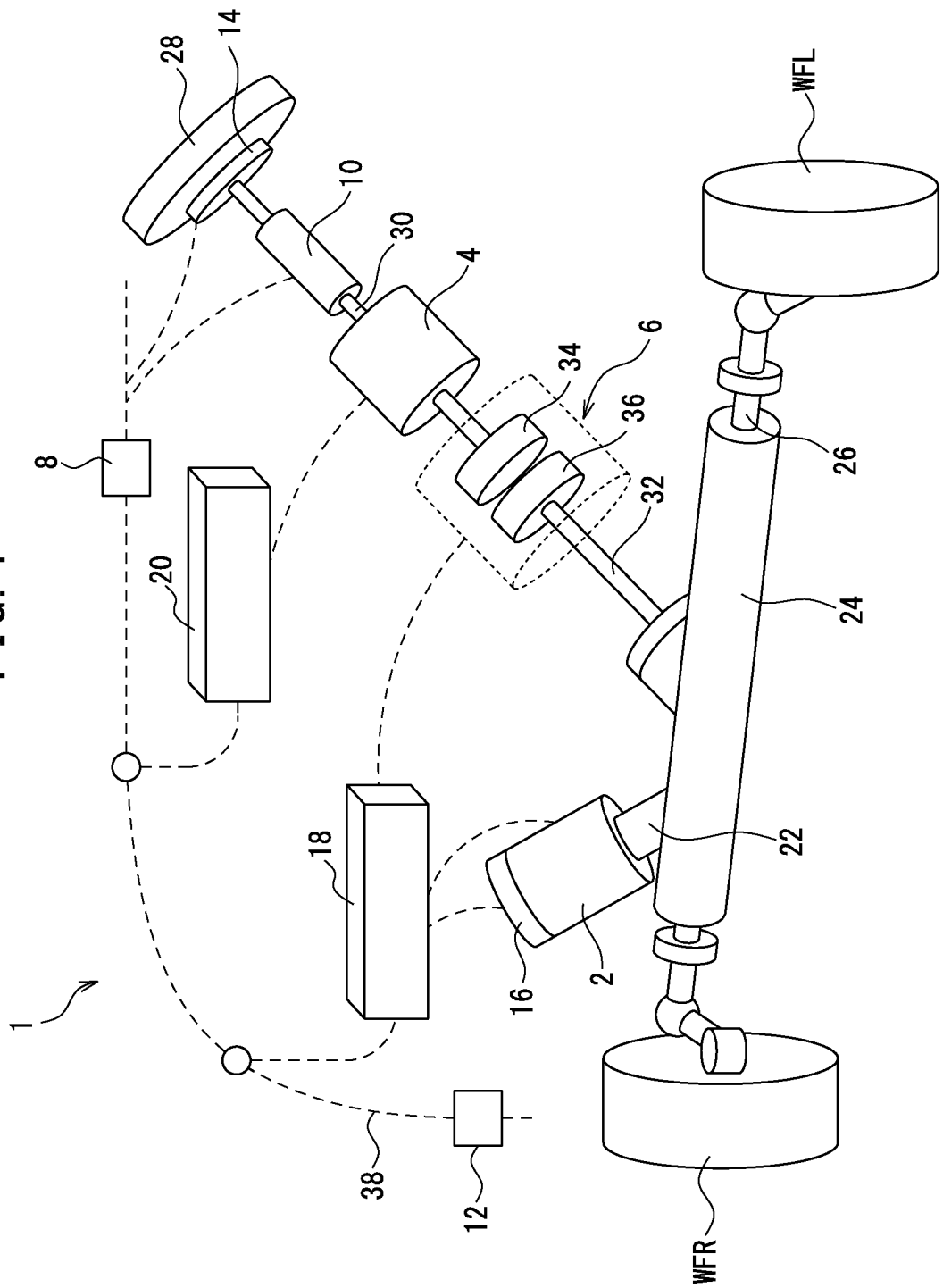
FIG. 1 is a view illustrative of a schematic configuration of a vehicle including a steering control apparatus, in a first embodiment of the present disclosure.

FIG. 1 is a view illustrative of a schematic configuration of a vehicle including a vehicle steering control apparatus (hereinafter, sometimes referred to as "steering control apparatus") in the present embodiment.

A vehicle including a steering control apparatus 1 in the present embodiment is a vehicle to which the SBW system is applied. In the SBW system, herein, driving of the turning motor is controlled in response to the vehicle driver's steering operation of the steering operation element (i.e., steering wheel), and turning of the turning wheels is controlled, so as to change the travel direction of the vehicle. The driving of the turning motor is controlled in a state where the backup clutch interposed between the steering operation element and the turning wheels is switched to a release state that is the normal state so that the torque transmission path between the steering operation element and the turning wheels is mechanically decoupled.

When an abnormality, for example, a disconnection or the like occurs in the SBW system, the backup clutch in the release state is switched to the engagement state to connect the torque transmission path mechanically, so that the turning of the turning wheels is continued by use of a force applied by a driver to the steering operation element.

As illustrated in FIG. 1, the steering control apparatus 1 in the present embodiment includes a turning motor 2, and a reaction force motor 4, and a backup clutch 6. In addition, the steering control apparatus 1 includes an engine instruction detector 8, a steering torque detector 10, a vehicle speed detector 12, a steering angle detector 14, a turning angle detector 16, a turning motor controller 18, and a reaction force motor controller 20.

The turning motor 2 is a motor that drives in response to a turning motor instruction current output from the turning motor controller 18, and outputs a turning torque to turn turning wheels W. The turning torque output from the turning motor 2 is transmitted to a rack gear 24 via a turning motor output shaft 22 to be rotated by driving of the turning motor 2.

The rack gear 24 includes a rack shaft 26 displaced in a vehicle-width direction in accordance with rotation of the turning motor output shaft 22. The both ends of the rack shaft 26 are coupled with the turning wheels W, respectively.

The turning wheels W are front wheels of the vehicle (i.e., left and right front wheels), and turn in accordance with a displacement in the vehicle-width direction of the rack shaft 26 and change the travel direction of the vehicle. It is to be noted that, in the present embodiment, the case where the turning wheels W are configured with left and right front wheels will be described. In accordance with this, in FIG. 1, the turning wheel W of the left front wheel is indicated as a turning wheel WFL, whereas the turning wheel of the right front wheel is indicated as a turning wheel WFR. The reaction force motor 4 is displaced between the steering operation element 28 and the backup clutch 6.

Further, the reaction force motor 4 is a motor that drives in response to a reaction force motor instruction current output from the reaction force motor controller 20, and is capable of outputting a steering reaction force to the steering shaft 30. Thus, the reaction force motor 4 outputs the steering reaction force to the steering operation element 28 through the steering shaft 30.

Herein, the steering reaction force that the reaction force motor 4 outputs to the steering operation element 28 is a reaction force outputtable to the steering shaft 30, in the state where the backup clutch 6 is switched to the release state and the torque transmission path between the steering operation element 28 and the turning wheels W is mechanically decoupled.

In other words, the steering reaction force that the reaction force motor 4 outputs to the steering shaft 30 is a reaction force to be exerted in an opposite direction to the operation direction that the driver steers the steering operation element 28. Furthermore, calculation of the steering reaction force is done in accordance with a tire axial force exerting on the turning wheels W or the steering state of the steering operation element 28. Accordingly, an appropriate steering reaction force is transmitted to the driver who is steering the steering operation element 28.

The backup clutch 6 is interposed between the steering operation element 28 that the driver operates and the turning wheels W, and is switched between the engagement sate and the release state depending on the clutch instruction current output from the turning motor controller 18. It is to be noted that the backup clutch 6 is in the release state, in the normal state.

When the state of the backup clutch 6 is switched to the release state, one end of the steering shaft 30 is spaced apart from one end of a pinion shaft 32. Thus, the torque transmission path between the steering operation element 28 and the turning wheels W is mechanically decoupled not to transmit the steering operation of the steering operation element 28 to the turning wheels W. It is to be noted that one end of the steering shaft 30 is coupled with a steering side clutch plate 34 in the inside of the backup clutch 6, and couples the other end of the steering shaft 30 with the steering operation element 28 to rotate with the steering operation element 28. Moreover, one end of the pinion shaft 32 is coupled with a turning side clutch plate 36 in the inside of the backup clutch 6, and engages a gear (not illustrated) arranged on the other end of the pinion shaft 32 with the rack gear 24.

On the other hand, when the state of the backup clutch 6 is switched to the engagement state, one end of the steering shaft 30 is coupled with one end of the pinion shaft 32. Accordingly, the torque transmission path between the steering operation element 28 and the turning wheels W is mechanically coupled to transmit the steering operation of the steering operation element 28 to the turning wheels W. Thus, the steering shaft 30 configures a part of the torque transmission path.

The engine instruction detector 8 outputs to the turning motor controller 18 an information signal including the state of the engine, not illustrated, (i.e., driving or stopping of the engine), which is a driving source to drive the driving wheels. It is to be noted that, in the present embodiment, as an example, the driving wheels are rear wheels (i.e., left and right rear wheels) of the vehicle, not illustrated. The present disclosure, however, is not limited to this. The turning wheels W may be configured to also serve as the driving wheels, as the front wheels of the vehicle, in one embodiment. Also, the driving source is not limited to the engine, and any motor capable of driving the driving wheels is applicable, in one embodiment.

For example, the steering torque detector 10 is provided in a steering column (not illustrated) rotatably supporting the steering operation element 28, and detects the torque applied to the steering shaft 30 when the driver operates the steering operation element 28. Then, the steering torque detector 10 outputs an information signal including the detected steering torque to the turning motor controller 18. It is to be noted that, in the following description, the steering torque will be referred to as "torque sensor value Vts", in some cases.

The vehicle speed detector 12 is a known vehicle speed sensor, and detects the vehicle speed. Then, the vehicle speed detector 12 outputs the information signal including the detected vehicle speed to the turning motor controller 18 and the reaction force motor controller 20. The steering angle detector 14 is configured with, for example, a resolver or the like, and is provided in the steering column, same as the steering torque detector 10. In addition, the steering angle detector 14 detects a current steering angle that is a current turning angle of the steering operation element 28 (i.e., steering operation amount). Then, the steering angle detector 14 outputs the information signal including the detected current steering angle of the steering operation element 28 to the turning motor controller 18 and the reaction force motor controller 20. It is to be noted that, in the following description, the current steering angle will be referred to as "current steering angle θs", in some cases.

The turning angle detector 16 is configured with, for example, a resolver, and is provided in the turning motor 2. In addition, the turning angle detector 16 detects a turning angle (i.e., turning angle) of the turning motor 2. Then, the turning angle detector 16 outputs an information signal including the detected turning angle (hereinafter, referred to as "turning motor rotation angle" in some cases) to the turning motor controller 18. It is to be noted that, in the following description, the turning motor rotation angle will be referred to as "actual turning angle θt", in some cases.

The turning motor controller 18 inputs and outputs the information signals to and from the reaction force motor controller 20, the engine instruction detector 8, and the vehicle speed detector 12 through communications lines 38 such as a CAN (i.e., Controller Area Network). In addition, the turning motor controller 18 controls driving of the turning motor 2 based on the information signal received through the communications lines 38 and the information signal received from the steering angle detector 14. It is to be noted that the detailed configuration of the turning motor controller 18 will be described later.

The reaction force motor controller 20 inputs and outputs the information signals to and from the turning motor controller 18 and the vehicle speed detector 12 through the communications lines 38. In addition, the reaction force motor controller 20 controls driving of the reaction force motor 4 based on the information signals received through the communications lines 38 and the information signal received from the steering angle detector 14. It is to be noted that the detailed configuration of the reaction force motor controller 20 will be described later.

(Detailed Configuration of Turning Motor Controller 18)

Figure 2:
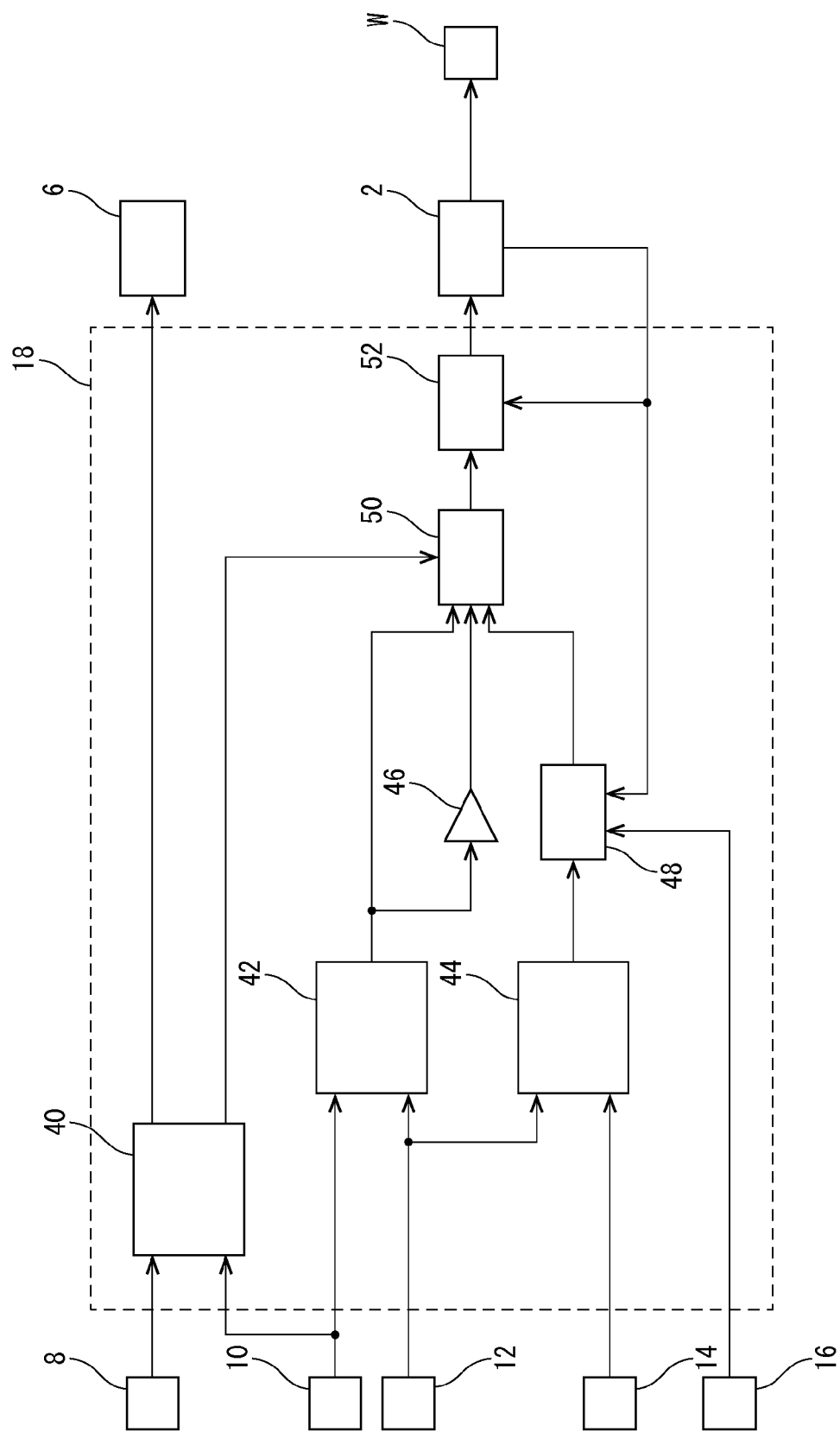
FIG. 2 is a block diagram illustrative of a detailed configuration of a turning motor controller.
Figure 3:
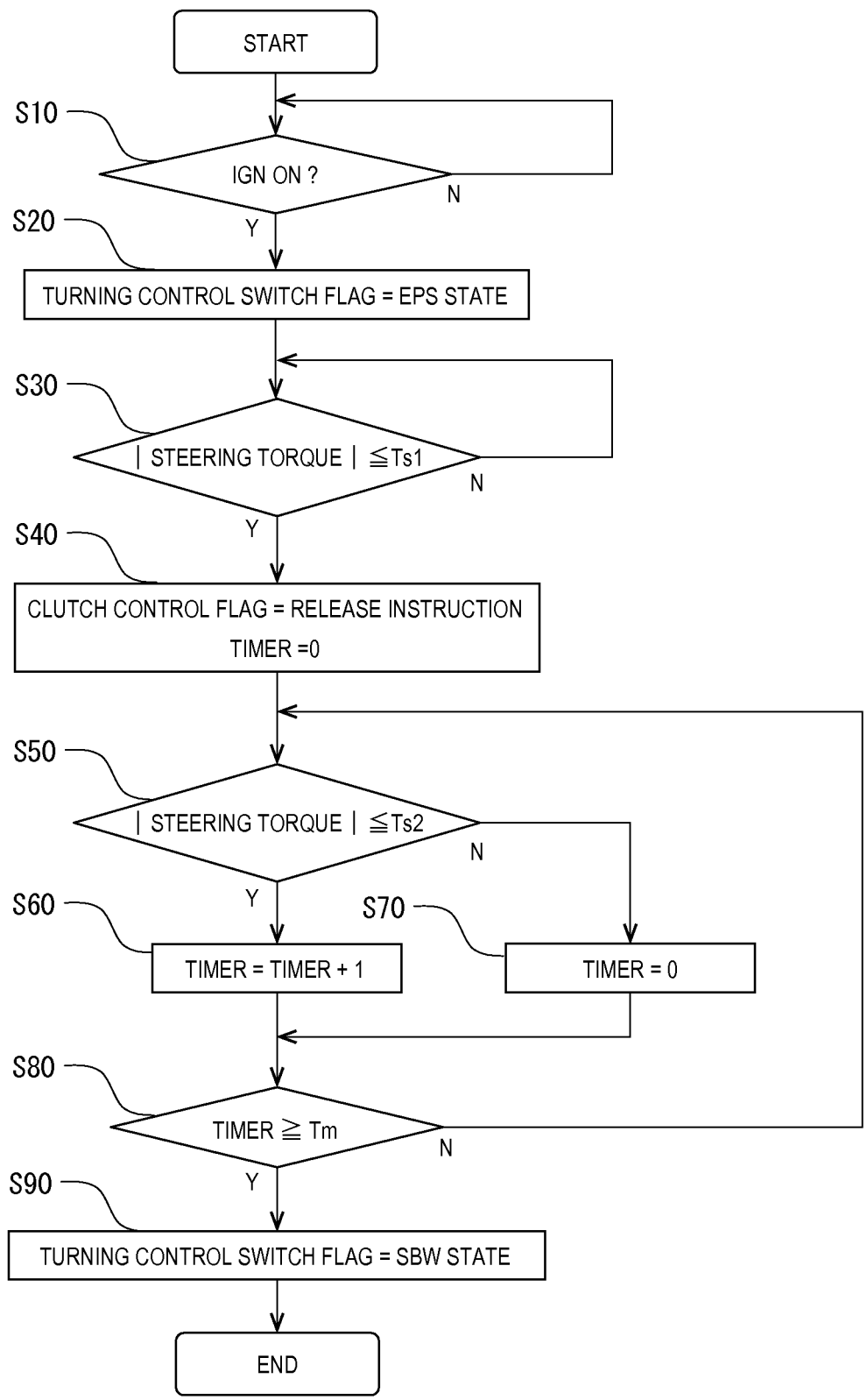
FIG. 3 is a flow chart illustrative of a process, by a clutch controller, of generating a clutch control flag and a turning control switch flag.

Hereinafter, the detailed configuration of the turning motor controller 18 will be described by use of FIG. 2 and FIG. 3, together with the relationship with another configuration of FIG. 2, with reference to FIG. 1. FIG. 2 is a block diagram illustrative of the detailed configuration of the turning motor controller 18.

As illustrated in FIG. 2, the turning motor controller 18 includes a clutch controller 40, an EPS controller 42, and an SBW turning instruction angle calculation unit 44. Additionally, the turning motor controller 18 also includes a gain addition unit 46, a turning position servo controller 48, a turning instruction current switch unit 50, and a turning instruction current servo controller 52.

The clutch controller 40 receives an input of the information signal output from the engine instruction detector 8 and an input of the information signal output from the steering torque detector 10. Then, the clutch controller 40 generates a clutch control flag and a turning control switch flag based on a state of the engine included in the information signal output from the engine instruction detector 8 and the torque sensor value Vts included in the information signal output from the steering torque detector 10.

Furthermore, the clutch controller 40 outputs the information signal including the generated clutch control flag to the backup clutch 6, as a clutch instruction current. In addition to this, the clutch controller 40 outputs the information signal including the generated turning control switch flag to the turning instruction current switch unit 50. Herein, the clutch control flag is an instruction value to switch the clutch instruction current to be output to the backup clutch 6, and has a release instruction and an engagement instruction. Further, the turning control switch flag is an instruction value to switch the turning instruction current to be output to the turning motor 2, and has an EPS state and an SBW state.

Hereinafter, with reference to FIG. 3, a process, by the clutch controller 40, of generating the clutch control flag and the turning control switch flag will be described. FIG. 3 is a flow chart illustrative of a process, by the clutch controller 40, of generating the clutch control flag and the turning control switch flag. The flow chart illustrated in FIG. 3 starts from the state where the engine of the vehicle stops (i.e., "START" indicated in the drawing).

At first, in step S10, the clutch controller 40 refers to the information signal output from the engine instruction detector 8, detects whether or not the engine that has stopped is activated, and determines whether or not the engine has started (i.e., "IGN ON?" indicated in the drawing).

In step S10, when it is determined that the engine has started (i.e., "Y" indicated in the drawing), the process to be done by the clutch controller 40 moves to step S20. On the other hand, in step S10, when it is determined that the engine has not started (i.e., "N" indicated in the drawing), the clutch controller 40 repeats the process of step S10. In step S20, the clutch controller 40 generates the turning control switch flag as an EPS state (i.e., "turning control switch flag=EPS state" indicated in the drawing). When the clutch controller 40 generates the turning control switch flag as the EPS state in step S20, the process to be done by the clutch controller 40 moves to step S30.

In step S30, the clutch controller 40 refers to the information signal output from the steering torque detector 10. Then, it is determined whether or not the absolute value of the torque sensor value Vts applied by the driver to the steering shaft 30 is equal to or lower than a predefined clutch release start torque Ts1 (i.e., "|steering torque|<=Ts1?" indicated in the drawing). It is to be noted that, in the present embodiment, as an example, a positive (+) torque is set to be the steering torque in the state where the steering operation element 28 has been rotated to the right (clockwise) from the neutral position, whereas a negative (−) torque is set to be the steering torque in the state where the steering operation element 28 has been rotated to the left (counterclockwise) from the neutral position.

In this situation, the clutch release start torque Ts1 is set according to, for example, the configuration of the vehicle provided with the steering control apparatus 1 (for example, stiffness properties of the steering operation element 28 and the steering shaft 30). In addition, the clutch release start torque Ts1 is stored in the clutch controller 40. It is to be noted that, for example, the clutch release start torque Ts1 is calculated by an experiment, for example. The value of the clutch release start torque Ts1 (i.e., torque value) is a value at which the impact applied from the steering operation element 28 to the driver steering the steering operation element 28 through driver's hands gripping the steering operation element 28 is small, when the backup clutch 6 is released.

When it is determined that the absolute value of the torque sensor value Vts is equal to or lower than the clutch release start torque Ts1 (i.e., "Y" indicated in the drawing) in step S30, the process to be done by the clutch controller 40 moves to step S40. On the other hand, when it is determined that the absolute value of the torque sensor value Vts is greater than the clutch release start torque Ts1 (i.e., "N" indicated in the drawing) in step S30, the clutch controller 40 repeats the process of step S30.

In step S40, the clutch controller 40 generates a clutch control flag as a release instruction (i.e., "clutch control flag=release instruction" indicated in the drawing). When, in step S40, when the clutch controller 40 generates the clutch control flag as the release instruction, the process to be done by the clutch controller 40 moves to step S50.

In step S50, the clutch controller 40 refers to the information signal output from the steering torque detector 10. Then, it is determined whether or not the absolute value of the torque sensor value Vts applied by the driver to the steering shaft 30 is equal to or lower than a predefined clutch release estimate torque Ts2 (i.e., "|steering torque|<=Ts2?" indicated in the drawing).

Herein, the clutch release estimate torque Ts2 is a torque lower than the clutch release start torque Ts1, and is set according to, for example, the configuration of the vehicle provided with the steering control apparatus 1 (for example, stiffness properties of the steering operation element 28 and the steering shaft 30). In addition, the clutch release estimate torque Ts2 is stored in the clutch controller 40, in a similar manner to the clutch release start torque Ts1. It is to be noted that the clutch release estimate torque Ts2 is calculated by an experiment, for example, in a similar manner to the clutch release start torque Ts1.

When it is determined that the absolute value of the torque sensor value Vts is equal to or lower than the clutch release estimate torque Ts2 in step S50 (i.e., "Y" indicated in the drawing), the process to be done by the clutch controller 40 moves to step S60. On the other hand, when it is determined that the absolute value of the torque sensor value Vts is greater than the clutch release estimate torque Ts2 in step S50 (i.e., "N" indicated in the drawing), the process to be done by the clutch controller 40 moves to step S70.

In step S60, the clutch controller 40 activates a timer included therein (i.e., "timer=timer+1" indicated in the drawing). Accordingly, the measurement of an elapsed time for determination, which is a period while the absolute value of the torque sensor value Vts is equal to or lower than the clutch release estimate torque Ts2, starts in step S60. When the measurement for the elapsed time for determination starts in step S60, the process to be done by the clutch controller 40 moves to step S80.

In step S70, the clutch controller 40 does not activate the timer included therein (i.e., "timer=0" indicated in the drawing), and the process to be done by the clutch controller 40 moves to step S80.

In step S80, it is determined whether or not the elapsed time for determination that is being measured is equal to or longer than a predefined SBW switch determination time Tm (i.e., "elapsed time for determination>=Tm?" indicated in the drawing).

In this situation, the SBW switch determination time Tm is a period from a time of starting the process of shifting the state of the backup clutch 6 from the engagement state to the release state to an estimated time when the backup clutch 6 is completely shifted to the release state. In addition, the SBW switch determination time Tm is set according to, for example, the configuration of the vehicle provided with the steering control apparatus 1 (for example, stiffness properties of the steering operation element 28 and the steering shaft 30).

Further, the SBW switch determination time Tm is stored in the clutch controller 40, in a similar manner to the clutch release start torque Ts1. It is to be noted that the SBW switch determination time Tm is calculated by an experiment, for example, in a similar manner to the clutch release start torque Ts1. When it is determined that the elapsed time for determination is equal to or longer than the SBW switch determination time Tm (i.e., "Y" indicated in the drawing) in step S80, the process to be done by the clutch controller 40 moves to step S90.

On the other hand, it is determined that the elapsed time for determination is shorter than the SBW switch determination time Tm (i.e., "N" indicated in the drawing) in step S80, the process to be done by the clutch controller 40 moves to step S50. In step S90, the clutch controller 40 generates a turning control switch flag as an SBW state (i.e., "turning control switch flag=SBW state" indicated in the drawing). When the clutch controller 40 generates the turning control switch flag as the SBW state in step S90, the process to be done by the clutch controller 40 comes to an end (i.e., "END" indicated in the drawing).

As described heretofore, the clutch controller 40 sets the backup clutch 6 to the engagement state when starting the engine. In addition to this, when the steering torque detected by the steering torque detector 10 after the engine starts is equal to or lower than the clutch release start torque Ts1, the clutch controller 40 switches the backup clutch 6 in the engagement state to the release state.

Moreover, when the elapsed time for determination is equal to or longer than the SBW switch determination time Tm after the engagement state of the backup clutch 6 starts to be switched to the release state, the clutch controller 40 determines that the shifting of the backup clutch 6 from the engagement state to the release state has been completed.

The EPS controller 42 receives an input of the information signal output from the steering torque detector 10 and an input of the information signal output from the vehicle speed detector 12. Then, the EPS controller 42 calculates a failure-timing EPS assist current based on the torque sensor value Vts included in the information signal output from the steering torque detector 10 and the vehicle speed included in the information signal output from the vehicle speed detector 12.

In addition, the EPS controller 42 outputs the information signal including the failure-timing EPS assist current that has been calculated to the gain addition unit 46 and the turning instruction current switch unit 50.

Herein, the failure-timing EPS assist current is an instruction value in accordance with a turning motor instruction current to output the steering assistance torque to the turning wheels W from the turning motor 2, when an abnormality, for example, a disconnection or the like occurs in the SBW system. In this situation, the steering assistance torque that the turning motor 2 outputs to the turning wheels W is a torque outputtable to the turning wheels W in a state where the backup clutch 6 is switched to the engagement state and the torque transmission path between the steering operation element 28 and the turning wheels W is mechanically coupled.

It is to be noted that, in the present embodiment, the turning assistance torque output from the turning motor 2 with the backup clutch 6 being set to the engagement state when starting the engine is set to a value to make the steering torque equal to or lower than the clutch release start torque. Accordingly, the torque value of the steering assistance torque output from the turning motor 2 with the backup clutch 6 being set to the engagement state when starting the engine is made to have a value to promote the driver who is operating the steering operation element 28 to perform the steering operation making the steering torque equal to or lower than the clutch release start torque.

In this case, for example, the backup clutch 6 is set to the engagement state, and the steering assistance torque output from the turning motor 2 is output as a torque opposite to the steering direction of the steering operation element 28 operated by the driver. Such an output torque is transmitted to the steering operation element 28 through the torque transmission path. It is to be noted that the torque value of the steering assistance torque to promote the driver who is operating the steering operation element 28 to perform the steering operation making the steering torque be equal to or lower than the clutch release start torque is calculated by, for example, an experiment based on performance data or the like of the vehicle provided with the steering control apparatus 1.

The SBW turning instruction angle calculation unit 44 receives an input of the information signal output from the vehicle speed detector 12 and an input of the information signal output from the steering angle detector 14. Then, the SBW turning instruction angle calculation unit 44 calculates a turning instruction angle based on the vehicle speed included in the information signal output from the vehicle speed detector 12 and the current steering angle Os included in the information signal output from the steering angle detector 14. In addition, the SBW turning instruction angle calculation unit 44 outputs the information signal including the turning instruction angle that has been calculated to the turning position servo controller 48.

Herein, the turning instruction angle is a current instruction value for calculating a target turning angle in response to the driver's operation of the steering operation element 28, and controls driving of the turning motor 2 depending on the target turning angle that has been calculated. The gain addition unit 46 receives an input of the information signal output from the EPS controller 42. Then, the gain addition unit 46 multiplies a predefined start-timing assist gain by the failure-timing EPS assist current included in the information signal output from the EPS controller 42 to calculate a start-timing EPS assist current.

In addition, the gain addition unit 46 outputs the information signal including the start-timing EPS assist current that has been calculated to the turning instruction current switch unit 50. Herein, the start-timing EPS assist current is an instruction value in response to the turning motor instruction current to output the turning assistance torque from the turning motor 2 to the turning wheels W when starting the engine. Further, the start-timing assist gain is set so that the start-timing EPS assist current should be greater than the failure-timing EPS assist current in accordance with the performance (i.e., output or the like) of the turning motor 2, and is stored in the gain addition unit 46.

As described heretofore, the turning assistance torque output from the turning motor 2 with the backup clutch 6 being set the engagement state when starting the engine is made to have a torque greater than the turning assistance torque output from the turning motor 2 with the backup clutch 6 being set to the engagement state at the time of failure of the steering control apparatus 1. The turning position servo controller 48 receives an input of the information signal output from the SBW turning instruction angle calculation unit 44. Then, the turning position servo controller 48 calculates the SBW turning instruction current based on the turning instruction angle included in the information signal output from the SBW turning instruction angle calculation unit 44.

In addition, the turning position servo controller 48 outputs the information signal including the SBW turning instruction current that has been calculated to the turning instruction current switch unit 50 and the turning instruction current servo controller 52. Herein, the SBW turning instruction current is an instruction value in accordance with the turning motor instruction current to output the torque depending on the target turning angle to the turning wheels W.

Further, the turning position servo controller 48 receives an input of the information signal output from the turning angle detector 16 and an input of the information signal output from the turning instruction current servo controller 52. In addition to this, the turning position servo controller 48 detects the turning motor instruction current that has finally been output to the turning motor 2. Then, the information signals output from the turning angle detector 16 and the turning instruction current servo controller 52, and the turning motor instruction current finally output to the turning motor 2 are used for calculating the SBW turning instruction current. Accordingly, the turning position servo controller 48 performs feedback control on the calculation of the SBW turning instruction current.

The turning instruction current switch unit 50 receives inputs of the information signals output from the clutch controller 40, the EPS controller 42, the gain addition unit 46, and the turning position servo controller 48. In addition, the turning instruction current switch unit 50 switches the turning instruction current based on the turning control switch flag included in the information signal output from the clutch controller 40. Then, the information signal including the switched current is output to the turning instruction current servo controller 52.

Specifically, when the turning control switch flag is in the EPS state and an abnormality occurs in the SBW system, the turning instruction current is switched to the failure-timing EPS assist current. It is to be noted that the abnormality occurring in the SBW system is detected by, for example, a monitor unit (not illustrated) to monitor the state of the SBW system. Furthermore, when the turning control switch flag is in the EPS state and no abnormality occurs in the SBW system, the turning instruction current is switched to the start-timing EPS assist current.

Additionally, when the turning control switch flag is in the SBW state, the turning instruction current is switched to the SBW turning instruction current. The turning instruction current servo controller 52 receives an input of the information signal output from the turning instruction current switch unit 50. Then, the turning instruction current servo controller 52 changes a voltage to be supplied to the turning motor 2, so that the turning motor instruction current depending on the turning instruction current included in the information signal output from the turning instruction current switch unit 50 should be input into the turning motor 2. In addition, the turning instruction current servo controller 52 inputs and outputs the information signals to and from the turning position servo controller 48. The information signal to be output to the turning position servo controller 48 from turning instruction current servo controller 52 includes a voltage to be supplied to the turning motor 2.

(Detailed Configuration of Reaction Force Motor Controller 20)

Figure 4:
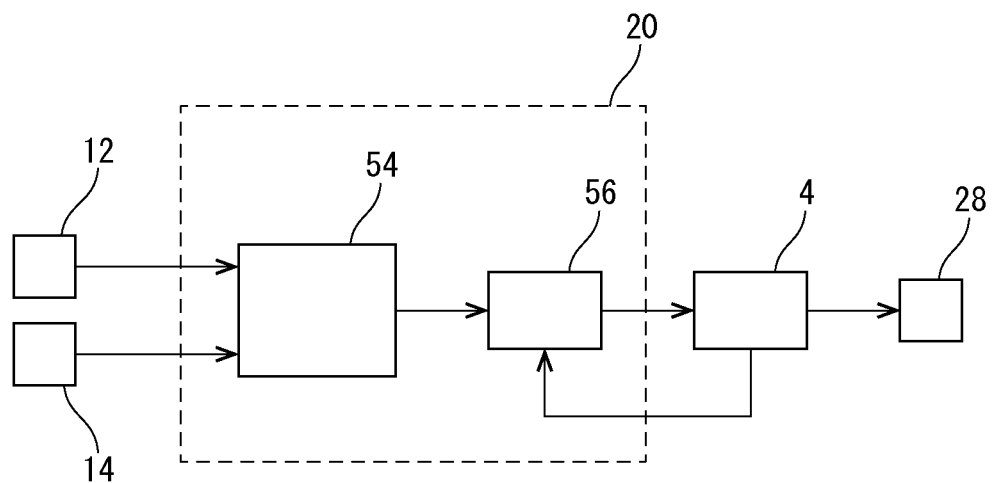
FIG. 4 is a block diagram illustrative of a detailed configuration of a reaction force motor controller.

Hereinafter, the configuration of the reaction force motor controller 20 will be described by using FIG. 4, with reference to FIG. 1 to FIG. 3, together with the relationship with another configuration of FIG. 4. FIG. 4 is a block diagram illustrative of a detailed configuration of the reaction force motor controller 20. As illustrated in FIG. 4, the reaction force motor controller 20 includes an SBW reaction force instruction current calculation unit 54, and a reaction force instruction current servo controller 56.

The SBW reaction force instruction current calculation unit 54 receives an input of the information signal output from the vehicle speed detector 12 and an input of the information signal output from the steering angle detector 14. Then, the SBW reaction force instruction current calculation unit 54 calculates the reaction force instruction current based on the vehicle speed included in the information signal output from the vehicle speed detector 12 and the current steering angle θs included in the information signal output from the steering angle detector 14.

In addition, the SBW reaction force instruction current calculation unit 54 outputs the information signal including the reaction force instruction current that has been calculated to the reaction force instruction current servo controller 56. Herein, the reaction force instruction current is a current instruction value to control the driving of the reaction force motor 4.

Further, the reaction force instruction current is obtained by, for example, multiplying the actual turning angle θt by a predefined reaction force motor gain. Herein, the reaction force motor gain is set beforehand by use of a reaction force gain map. It is to be noted that the reaction force gain map is a map depending on the vehicle speed and the steering angle of the steering operation element 28, is created beforehand, and is stored in the SBW reaction force instruction current calculation unit 54.

Then, the SBW reaction force instruction current calculation unit 54 outputs the information signal including the reaction force instruction current that has been calculated to the reaction force instruction current servo controller 56. The reaction force instruction current servo controller 56 receives an input of the information signal output from the SBW reaction force instruction current calculation unit 54. Then, the reaction force instruction current servo controller 56 changes the voltage to be supplied to the reaction force motor 4, so that the reaction force motor instruction current depending on the reaction force instruction current included in the information signal output from the SBW reaction force instruction current calculation unit 54 should be input to the reaction force motor 4.

Furthermore, the reaction force instruction current servo controller 56 detects the reaction force motor instruction current that has been finally output to the reaction force motor 4. Subsequently, the reaction force motor instruction current that has been finally output to the reaction force motor 4 is used for controlling the voltage to be supplied to the reaction force motor 4. Accordingly, the reaction force instruction current servo controller 56 performs the feedback control on the voltage to be supplied to the reaction force motor 4.

(Operations)

Figure 5:
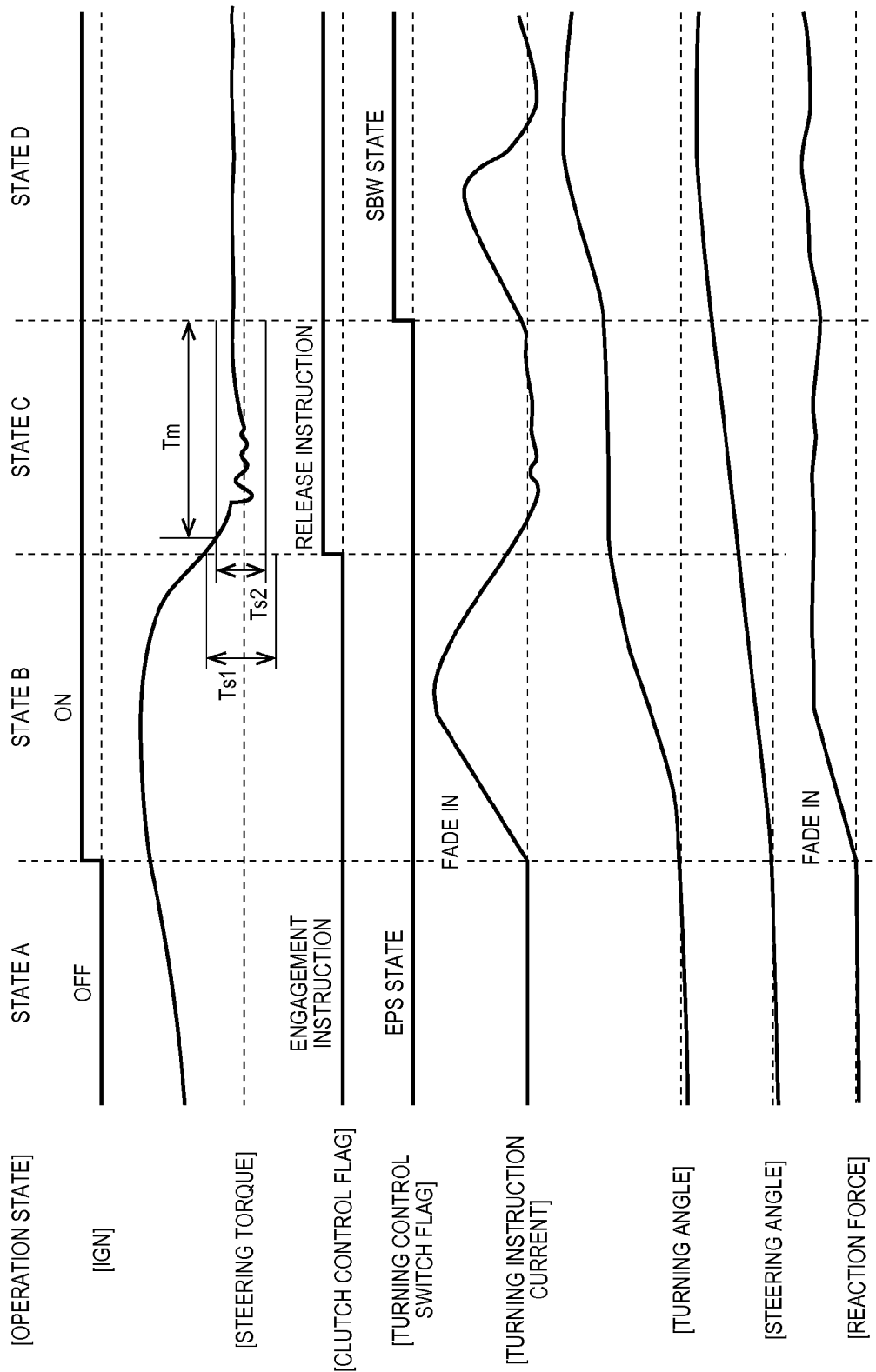
FIG. 5 is a time chart illustrative of an example of an operation to be performed by the steering control apparatus.

Next, an example of the operation to be performed by use of the steering control apparatus 1 in the present embodiment will be described by using FIG. 5, with reference to FIG. 1 to FIG. 4. FIG. 5 is a time chart illustrative of an example of the operation to be performed by using the steering control apparatus 1. The time chart illustrated in FIG. 5 starts from a waiting state (i.e., "state A" indicated in the drawing) where the engine stops and the operation of the ignition switch, not illustrated, by the driver who is sitting on the driver's seat in a vehicle is being waited for. In this situation, the ignition switch is configured with, for example, a button (i.e., ignition button) to be operated by the vehicle driver.

In the state A, the ignition switch is not operated (i.e., "OFF" indicated in the drawing), as depicted in "IGN" column representing the operation state of the ignition switch. Thus, in the state A, the turning instruction current is "0" as depicted in "turning instruction current" column, and as depicted in "reaction force" column, the steering reaction force output from the reaction force motor 4 to the steering shaft 30 is "0". In addition, as depicted in "clutch control flag" column, the clutch control flag is an "engagement instruction". Furthermore, as depicted in "turning control switch flag" column, the turning control switch flag is in the "EPS state".

In the present embodiment, in the state A, a case where the vehicle driver is steering the steering operation element 28, such as a case where the vehicle driver is gripping the steering operation element 28, will be described. Thus, in the state A, as depicted in "steering torque" column, the torque sensor value Vts detected by the steering torque detector 10 is greater than a state where the driver is not steering the steering operation element 28. Further, in the state A, since the clutch control flag indicates the "engagement instruction", the backup clutch 6 is engaged, and the torque transmission path between the steering operation element 28 and the turning wheels W is mechanically coupled.

For this reason, in the state A, the current steering angle Os detected by the steering angle detector 14 is changing as depicted in the "steering angle" column, in response to the driver's steering operation of the steering operation element 28. In addition to this, the actual turning angle θt detected by the turning angle detector 16 is changing as indicated in the "turning angle". In the state A, when the ignition switch is operated by the driver (i.e., "ON" indicated in the drawing) and the engine instruction detector 8 detects the activation of the engine as a state of the engine, the operation performed by use of the steering control apparatus 1 shifts from the state A to the state B.

In the state B, the EPS controller 42 calculates the failure-timing EPS assist current, and outputs the information signal including the failure-timing EPS assist current that has been calculated to the gain addition unit 46 and the turning instruction current switch unit 50. Then, the gain addition unit 46 multiplies the failure-timing EPS assist current by the start-timing assist gain, so as to calculate the start-timing EPS assist current greater than the failure-timing EPS assist current. Moreover, the gain addition unit 46 outputs the information signal including the start-timing EPS assist current that has been calculated to the turning instruction current switch unit 50.

Then, the turning instruction current switch unit 50 switches the turning instruction current to the start-timing EPS assist current based on the turning control switch flag. Further, the turning instruction current switch unit 50 outputs the information signal including the start-timing EPS assist current to the turning instruction current servo controller 52. Then, the turning instruction current servo controller 52 that has received the input of the information signal including the start-timing EPS assist current changes the voltage to be supplied to the turning motor 2, so that the turning motor instruction current according to the start-timing EPS assist current should be input to the turning motor 2.

Accordingly, as depicted in "turning instruction current" column, the turning motor instruction current input to the turning motor 2 changes according to the steering angle of the steering operation element 28, after having gradually increased with elapse of time (i.e., "fade in" indicated in the drawing). Herein, in the present embodiment, the start-timing EPS assist current is set to be greater value than the failure-timing EPS assist current. Therefore, it is possible to set the turning motor instruction current input to the turning motor 2 when starting the engine to be greater than the turning motor instruction current input to the turning motor 2 when an abnormality occurs in the SBW system.

In addition, as the steering angle of the steering operation element 28 is increased, the turning angle of the turning wheels W are increased. In addition to this, as the steering angle of the steering operation element 28 is increased, the steering reaction force output from the reaction force motor 4 to the steering shaft 30 changes in accordance with the steering angle of the steering operation element 28, after having gradually increased with elapse of time (i.e., "fade in" indicated in the drawing). Further, in the state B, the clutch control flag is maintained in the "engagement instruction" in a similar manner to the state A, and the turning control switch flag is maintained in the "EPS state".

In the state B, the steering torque that the driver is applying to the steering shaft 30 becomes lower, and when the absolute value of the torque sensor value Vts becomes equal to or lower than the clutch release start torque Ts1, the operation performed by use of the steering control apparatus 1 shifts from the state B to the state C. In the state C, the clutch controller 40 generates the clutch control flag as a "release instruction". Then, the clutch controller 40 outputs the information signal generated as the "release instruction" to the backup clutch 6 as a clutch instruction current. The backup clutch 6 that has received the input of the clutch instruction current starts shifting from the engagement state to the release state.

In addition, in the state C, the turning control switch flag is maintained in the "EPS state", in a similar manner to the state B. Further, in the state C, the reaction force motor 4 outputs the steering reaction force in accordance with the steering angle of the steering operation element 28 to the steering shaft 30, in a similar manner to the state B. Thus, after a state where the backup clutch 6 is set to the engagement state and the turning motor 2 outputs the turning assistance torque, until a state where the backup clutch 6 in the engagement state is switched to the release state, the reaction force motor controller 20 outputs the steering reaction force to the steering shaft 30.

For this reason, in the present embodiment, in the state C, where the turning motor 2 is outputting the turning assistance torque and the reaction force motor 4 is outputting the steering reaction force to the steering shaft 30, the backup clutch 6 in the engagement state is switched to the release state. Accordingly, in the present embodiment, the impact transmitted to the steering operation element 28 from the backup clutch 6 when the engagements state is switched to the release state is lower than the steering reaction force to be output by the reaction force motor 4 to the steering shaft 30.

When the absolute value of the torque sensor value Vts is equal to or lower than the clutch release estimate torque Ts2 in the state C, the timer included in the clutch controller 40 is activated to start the measurement of the elapsed time for determination. When the elapsed time for determination becomes equal to or longer than the SBW switch determination time, the clutch controller 40 determines that shifting from the engagement state of the backup clutch 6 to the release state is completed. Then, the operation performed by use of the steering control apparatus 1 shifts from the state C to the state D.

In the state D, the clutch controller 40 generates a turning control switch flag as the "SBW state". Then, the clutch controller 40 outputs the information signal including the turning control switch flag that has been generated as "SBW state" to the turning instruction current switch unit 50. Accordingly, in the present embodiment, when the elapsed time for determination is shorter than the SBW switch determination time Tm, it is determined that shifting from the engagement state to the release state of the backup clutch 6 is not completed, the turning control switch flag is maintained in the "EPS state".

Next, the turning instruction current switch unit 50 switches the turning instruction current from the start-timing EPS assist current to the SBW turning instruction current based on the turning control switch flag. Moreover, the turning instruction current switch unit 50 outputs the information signal including the SBW turning instruction current to the turning instruction current servo controller 52. Then, the turning instruction current servo controller 52 that has received the input of the information signal including the SBW turning instruction current changes the voltage to be supplied to the turning motor 2, so that the turning motor instruction current according to the SBW turning instruction current should be input to the turning motor 2.

In other words, the turning motor controller 18 causes the turning motor 2 to output the turning assistance torque, when the clutch controller 40 sets the state of the backup clutch 6 to the engagement state. In addition to this, the turning motor controller 18 causes the turning motor 2 to output the turning torque depending on the target turning angle, in accordance with the SBW turning instruction current, when the clutch controller 40 switches the backup clutch 6 in the engagement state to the release state.

Furthermore, when the clutch controller 40 determines that shifting from the engagement state of the backup clutch 6 to the release state is completed, the turning motor controller 18 outputs the turning torque depending on the target turning angle to control driving of the turning motor 2. Accordingly, as depicted in "turning instruction current" column, the turning motor instruction current input to the turning motor 2 gradually increases with elapse of time ("fade in" indicated in the drawing), and then changes in accordance with the steering angle of the steering operation element 28.

In addition, when the backup clutch 6 in the engagement state is switched to the release state, shifting from the EPS state to the SBW state is enabled with the impact received by the driver's hands gripping the steering operation element 28 being made possible to be reduced. Further, in the state D, the clutch control flag is maintained in the "release instruction" in a similar manner to the state C.

It is to be noted that, according to a steering control method to be performed in the operation of the steering control apparatus 1, in the present embodiment, as described above, the steering torque applied by the driver to the steering shaft 30 is detected. In addition to this, the backup clutch 6 is set to the engagement state in starting the engine, and when the steering torque detected after the start of the engine is equal to or lower than the clutch release start torque Ts 1, the backup clutch 6 in the engagement state is switched to the release state. Furthermore, when the state of the backup clutch 6 is set to the engagement state, the turning assistance torque is output from the turning motor 2, and when the backup clutch 6 in the engagement state is switched to the release state, the turning torque depending on the target turning angle is output from the turning motor 2.

(Advantageous Effect of the First Embodiment)

In some embodiments, advantageous effects to be described below can be brought about.

(1) The clutch controller 40 sets the backup clutch 6 to the engagement state in starting the engine, and when the absolute value of the torque sensor value Vts is equal to or lower than the clutch release start torque Ts1 after the engine starts, the backup clutch 6 in the engagement state is switched to the release state. In addition, when the clutch controller 40 sets the state of the backup clutch 6 to the engagement state, the turning motor controller 18 causes the turning motor 2 to output the turning assistance torque according to the start-timing EPS assist current. Further, when the clutch controller 40 switches the backup clutch 6 in the engagement state to the release state, the turning torque depending on the target turning angle is output from the turning motor 2, in accordance with the SBW turning instruction current. Accordingly, when the backup clutch 6 in the engagement state is switched to the release state, shifting from the EPS state to the SBW state is enabled with the impact received by the driver through the driver's hands gripping the steering operation element 28 being made possible to be reduced. As a result, it is possible to suppress the steering state of the steering operation element 28 from being different from the driver's intention when starting the engine. Moreover, it is possible to suppress the driver's hands gripping the steering operation element 28 from losing control by the steering operation element 28, and it is also possible to smoothly shift from the EPS state to the SBW state.

(2) When the absolute value of the torque sensor value Vts is equal to or lower than the clutch release start torque Ts1 after the engine starts, the clutch controller 40 switches the backup clutch 6 in the engagement state to the release state. Accordingly, it is possible to suppress a free vibration of the steering torque detector 10 or the steering shaft 30 caused by a change in the steering torque generated when the backup clutch 6 in the engagement state is switched to the release state. As a result, it is possible to suppress a noise or vibration generated when the backup clutch 6 in the engagement state is switched to the release state, and it is also possible to reduce a sense of discomfort that the driver feels.

(3) The turning motor controller 18 sets the torque value of the turning assistance torque output from the turning motor 2 in a state where the backup clutch 6 is in the engagement state when starting the engine to have a value making the steering torque equal to or lower than the clutch release start torque. Accordingly, when the backup clutch 6 in the engagement state is switched to the release state, shifting from the EPS state to the SBW state is enabled with a sense of discomfort received by the driver gripping the steering operation element 28 being enabled to be reduced. As a result, it is possible to reduce a sense of discomfort received by the driver gripping the steering operation element 28 when starting the engine, and it is also possible to smoothly shift from the EPS state to the SBW state.

(4) The turning motor controller 18 sets the turning assistance torque output at the time of starting the engine to be greater than the turning assistance torque output at the time of a failure of the steering control apparatus 1. In other words, the start-timing EPS assist current is set to be greater than the failure-time EPS assist current. Accordingly, it is possible to set the turning motor instruction current input to the turning motor 2 when starting the engine to be greater than the turning motor instruction current input to the turning motor 2 when an abnormality occurs in the SBW system. As a result, by shortening the time while the driver is reducing the steering torque applied to the steering shaft 30 when starting the engine, it is made possible to shorten the time needed for switching the backup clutch 6 in the engagement state to the release state.

(5) After a state where the backup clutch 6 is set to the engagement state and the turning motor 2 outputs the turning assistance torque, until a state where the backup clutch 6 in the engagement state is switched to the release state, the reaction force motor controller 20 outputs the steering reaction force to the steering shaft 30. Accordingly, it is possible to switch the backup clutch 6 in the engagement state to the release state, while the turning motor 2 is outputting the turning assistance torque and the reaction force motor 4 is outputting the steering reaction force to the steering shaft 30. As a result, the impact transmitted to the steering operation element 28 through the steering shaft 30 from the backup clutch 6 when the engagement state is switched to the release state is lower than the steering reaction force output from the reaction force motor 4 to the steering shaft 30. Thus, it is possible to reduce a sense of discomfort such as a change in the reaction force or the like felt by the driver who is gripping the steering operation element 28 in response to switching from the engagement state of the backup clutch 6 to the release state.

(6) When the elapsed time for determination is equal to or longer than the SBW switch determination time Tm, the clutch controller 40 determines that shifting from the engagement state of the backup clutch 6 to the release state is completed. In addition to this, when the clutch controller 40 determines that the shifting from the engagement state of the backup clutch 6 to the release state is completed, the turning motor controller 18 outputs the turning torque depending on the target turning angle. Accordingly, when the elapsed time for determination is shorter than the SBW switch determination time Tm, the clutch controller 40 determines that shifting from the engagement state of the backup clutch 6 to the release state is not completed, and the turning control switch flag is maintained in the "EPS state". As a result, even after the release instruction is output to the backup clutch 6, as far as the backup clutch 6 is in the engagement state, the state where the turning assistance torque is output from the turning motor 2 is maintained. Accordingly, it is possible to improve the certainty of the process of shifting from the engagement state of the backup clutch 6 to the release state. In addition, as a method of improving the certainty of the process of shifting the backup clutch 6 from the engagement state to the release state, there is a method of setting the backup clutch 6 to the release state with the driving (i.e., turning) of the turning motor 2 and the reaction force motor 4 being stopped. Further, there is a method of interlocking the driving (i.e., turning) of the turning motor 2 with the driving (i.e., turning) of the reaction force motor 4. In the above-described two methods, however, the driver who is gripping the steering operation element 28 will feel a sense of discomfort from the impact in setting the backup clutch 6 to the release state or from the turning motor 2 and the reaction force motor 4 interlocking with each other. In contrast, according to the process performed by the clutch controller 40 in the present embodiment, when the backup clutch 6 is in the engagement state, the state of outputting the turning assistance torque from the turning motor 2 is maintained. Accordingly, it is possible to reduce a sense of discomfort felt by the driver who is gripping the steering operation element 28, and it is also possible to improve the certainty of the process of shifting from the engagement state of the backup clutch 6 to the release state.

(7) In the steering control method in the present embodiment, the steering torque to be applied to the steering shaft 30 is detected when the driver operates the steering operation element 28. In addition to this, the backup clutch 6 is set to the engagement state when starting the engine. When the steering torque detected after the engine starts is equal to or lower than the clutch release start torque Ts1, the backup clutch 6 in the engagement state is switched to the release state. Moreover, when the backup clutch 6 is set to the engagement state, the turning assistance torque is output from the turning motor 2. When the backup clutch 6 in the engagement state is switched to the release state, the turning torque in accordance with the turning angle is output from the turning motor 2. Accordingly, when the backup clutch 6 in the engagement state is switched to the release state, it is possible to shift from the EPS state to the SBW state with the impact received by the driver through the driver's hands gripping the steering operation element 28 being enabled to be reduced. As a result, it is possible to suppress the steering state of the steering operation element 28 from being different from the driver's intention when starting the engine. In addition, it is possible to suppress the driver's hands gripping the steering operation element 28 from losing control by the operation of the steering operation element 28, and it is also possible to smoothly shift from the EPS state to the SBW state. Accordingly, it is possible to suppress a free vibration of the steering torque detector 10 or the steering shaft 30 caused by a change in the steering torque generated when the backup clutch 6 in the engagement state is switched to the release state. As a result, it is possible to suppress a noise or vibration generated when the backup clutch 6 in the engagement state is switched to the release state, and it is also possible to reduce a sense of discomfort that the driver feels.

(Modifications)

(1) In some embodiments, when the elapsed time for determination is equal to or longer than the SBW switch determination time Tm, the clutch controller 40 determines that shifting from the engagement state of the backup clutch 6 to the release state is completed. However, the present disclosure is not limited to this. In other words, for example, the clutch controller 40 may do the following process to be described below, in another embodiment.

After shifting from the engagement state of the backup clutch 6 to the release state starts, when the absolute value of the torque sensor value Vts becomes equal to or lower than the clutch release estimate torque Ts2, the clutch controller 40 determines that shifting from the engagement state of the backup clutch 6 to the release state is completed. In addition, until the elapsed time for determination is equal to or longer than the SBW switch determination time Tm, when the absolute value of the torque sensor value Vts is greater than the clutch release estimate torque Ts2, the backup clutch 6 in the release state is switched to the engagement state.

With the above configuration, it is possible to shorten the time elapsed from the EPS state to the SBW state, and it is possible to improve the responsiveness of the steering control apparatus 1 and also improve a feeling of steering received by a driver.

(Second Embodiment)

Hereinafter, a second embodiment (hereinafter, referred to as the present embodiment) of the present disclosure will be described by use of FIG. 6, with reference to FIG. 1 to FIG. 5. It is to be noted that in the present embodiment, the configuration is same as that in the first embodiment, except the configuration of the turning motor controller 18. Therefore, the descriptions other than the turning motor controller 18 will be omitted. In addition, the same configurations as in the first embodiment will be described with the same reference numerals.

(Configuration)

Figure 6:
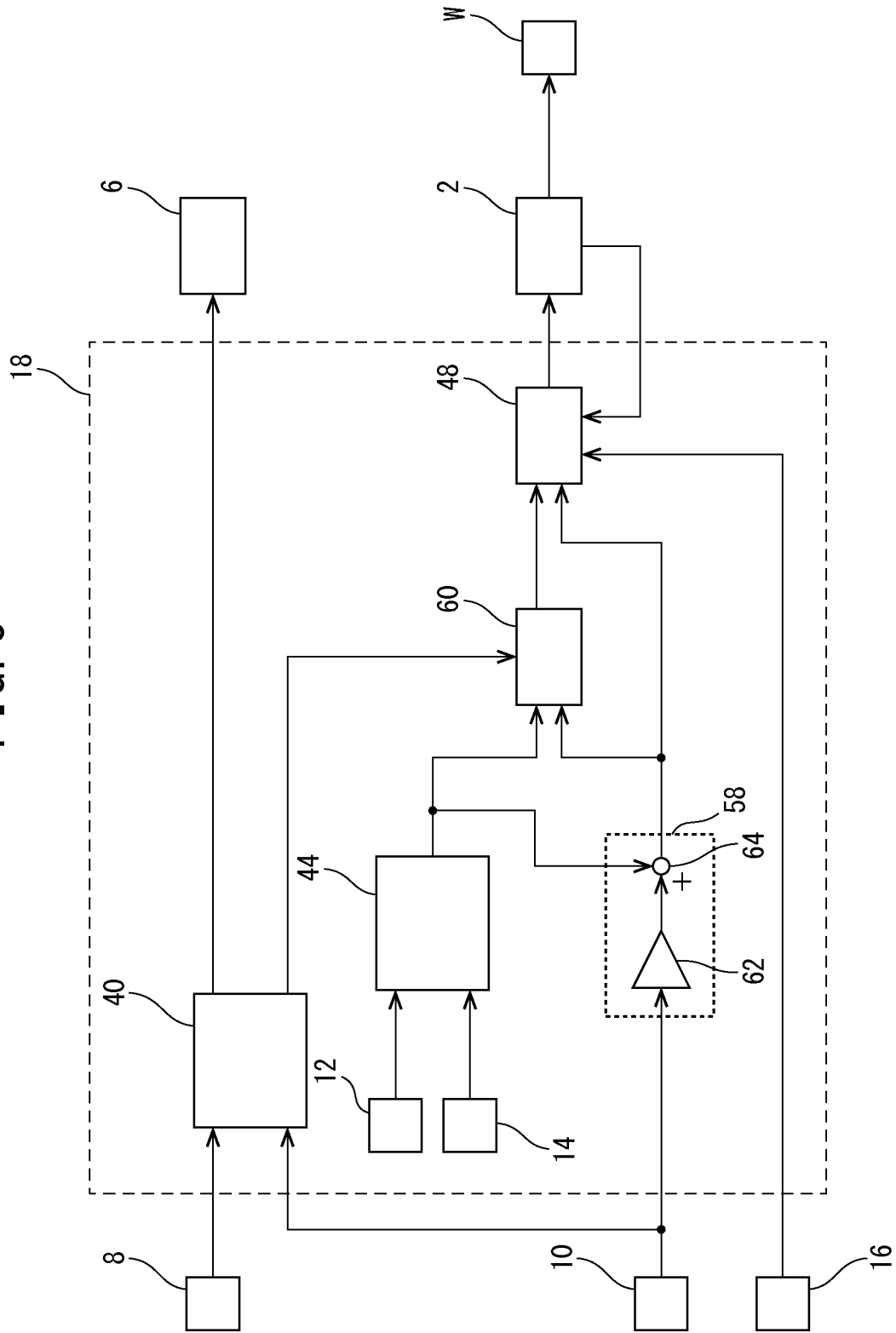
FIG. 6 is a block diagram illustrative of a detailed configuration of the turning motor controller included in the steering control apparatus, in a second embodiment of the present disclosure.

FIG. 6 is a block diagram illustrative of a detailed configuration of the turning motor controller 18. As illustrated in FIG. 6, the turning motor controller 18 includes the clutch controller 40, the SBW turning instruction angle calculation unit 44, an EPS corresponding turning instruction angle calculation unit 58, a turning instruction angle switch unit 60, and the turning position servo controller 48. The configuration of the clutch controller 40 is similar to that of the first embodiment as described above, and its description will be omitted.

The SBW turning instruction angle calculation unit 44 receives inputs of the information signal output from the vehicle speed detector 12 and the information signal output from the steering angle detector 14. Then, the SBW turning instruction angle calculation unit 44 calculates a turning instruction angle based on the vehicle speed included in the information signal output from the vehicle speed detector 12 and the current steering angle Os included in the information signal output from the steering angle detector 14. In addition, the SBW turning instruction angle calculation unit 44 outputs the information signal including the turning instruction angle that has been calculated to the EPS corresponding turning instruction angle calculation unit 58 and the turning instruction angle switch unit 60.

The EPS corresponding turning instruction angle calculation unit 58 includes a turning assistance torque calculation gain generator 62 and a turning instruction angle correction unit 64. The turning assistance torque calculation gain generator 62 receives the information signal output from the steering torque detector 10. Then, the turning assistance torque calculation gain generator 62 multiplies the torque sensor value Vts included in the information signal output from the steering torque detector 10 by a predefined turning assistance torque correction coefficient, so as to generate a turning assistance torque calculation gain.

Herein, the turning assistance torque correction coefficient is set depending on the performance (i.e., output or the like) of the turning motor 2, and is stored in the turning assistance torque calculation gain generator 62. Further, the turning assistance torque calculation gain generator 62 outputs the information signal including the turning assistance torque calculation gain that has been generated to the turning instruction angle correction unit 64. The turning instruction angle correction unit 64 receives inputs of the information signal output from the SBW turning instruction angle calculation unit 44 and the information output from the turning assistance torque calculation gain generator 62. Then, the turning instruction angle correction unit 64 adds (i.e., +) the turning assistance torque calculation gain generated by the turning assistance torque calculation gain generator 62 to the turning instruction angle included in the information signal output from the SBW turning instruction angle calculation unit 44, so as to calculate an EPS corresponding turning instruction angle.

Moreover, the turning instruction angle correction unit 64 outputs the information signal including the EPS corresponding turning instruction angle that has been calculated to the turning instruction angle switch unit 60. Herein, the EPS corresponding turning instruction angle is a current instruction value to control the driving of the turning motor 2 according to the turning assistance torque.

As described above, the EPS corresponding turning instruction angle calculation unit 58 calculates the EPS corresponding turning instruction angle based on the torque sensor value Vts included in the information signal output from the steering torque detector 10 and the predefined turning assistance torque calculation gain.

Thus, the turning motor controller 18 in the present embodiment corrects the turning instruction angle to calculate the turning torque depending on the target turning angle by use of the predefined turning assistance torque calculation gain, so as to calculate the turning assistance torque. The turning instruction angle switch unit 60 receives inputs of the information signals output from the clutch controller 40, the SBW turning instruction angle calculation unit 44, and the EPS corresponding turning instruction angle calculation unit 58.

In addition, the turning instruction angle switch unit 60 switches the turning instruction angle based on the turning control switch flag included in the information signal output from the clutch controller 40. Then, the information signal including the turning instruction angle that has been switched is output to the turning position servo controller 48. Specifically, when the turning control switch flag is in the EPS state, the turning instruction angle is switched to the SBW turning instruction angle.

Further, when the turning control switch flag is in the SBW state, the turning instruction angle is switched to the EPS corresponding turning instruction angle. The turning position servo controller 48 receives an input of the information signal output from the turning instruction angle switch unit 60. Then, the turning position servo controller 48 calculates the turning instruction current based on the turning instruction angle included in the information signal output from the turning instruction angle switch unit 60. In this situation, the turning instruction current that has been calculated by the turning position servo controller 48 is an instruction value according to the turning motor instruction current for outputting to turning wheels W the torque corresponding to the turning instruction angle that has been switched to by the turning instruction angle switch unit 60.

Moreover, the turning position servo controller 48 receives an input of the information signal output from the turning angle detector 16. In addition to this, the turning position servo controller 48 detects the turning motor instruction current that has finally been output to the turning motor 2. Then, the information signal output from the turning angle detector 16 and the turning motor instruction current that has finally been output to the turning motor 2 are used in the calculation of the turning instruction current. Accordingly, the turning position servo controller 48 performs feedback control about the calculation of the turning instruction current. Further, the turning position servo controller 48 changes the voltage to be supplied to the turning motor 2, so that the turning motor instruction current depending on the turning instruction current that has been calculated should be input to the turning motor 2.

(Operations)

Next, with reference to FIG. 1 and FIG. 4 to FIG. 6, an example of the operations by using the steering control apparatus 1 in the present embodiment will be described. In a vehicle including the steering control apparatus 1 in the present embodiment, when the driver operates an ignition switch to start the operation, the EPS corresponding turning instruction angle calculation unit 58 calculates an EPS corresponding turning instruction angle. Then, the information signal including the EPS corresponding turning instruction angle that has been calculated is output to the turning instruction angle switch unit 60. The clutch controller 40 generates the clutch control flag as the "engagement instruction", and in addition, generates the turning control switch flag as the "EPS state".

Next, the turning instruction angle switch unit 60 switches the turning instruction angle to the EPS corresponding turning instruction angle based on the turning control switch flag. Further, the information signal including the EPS corresponding turning instruction angle is output to the turning position servo controller 48. The turning position servo controller 48 that has received an input of the information signal including the start-timing EPS assist current changes the voltage to be supplied to the turning motor 2, so that the turning motor instruction current corresponding to the EPS corresponding turning instruction angle should be input to the turning motor 2.

When the steering torque that the driver applies to the steering shaft 30 decreases and the absolute value of the torque sensor value Vts is equal to or lower than the clutch release start torque Ts1, the clutch controller 40 generates the clutch control flag as the "release instruction". Then, the clutch controller 40 outputs the information signal generated as the "release instruction" to the backup clutch 6 as a clutch instruction current. The backup clutch 6 that has received an input of the clutch instruction current starts shifting from the engagement state to the release state. It is to be noted that, in this state, the turning control switch flag is maintained in the "EPS state". In addition, the reaction force motor 4 outputs the steering reaction force according to the steering angle of the steering operation element 28 to the steering shaft 30.

Subsequently, when the absolute value of the torque sensor value Vts is equal to or lower than the clutch release estimate torque Ts2, the measurement of the elapsed time for determination starts. When the elapsed time for determination that has been measured is equal to or longer than the SBW switch determination time Tm, the clutch controller 40 determines that shifting from the engagement state of the backup clutch 6 to the release state is completed, and generates a turning control switch flag as the "SBW state". Then, the clutch controller 40 outputs the information signal including the turning control switch flag that has been generated as the "SBW state" to the turning instruction angle switch unit 60.

Subsequently, the turning instruction angle switch unit 60 switches the turning instruction angle from the EPS corresponding turning instruction angle to the SBW turning instruction angle based on the turning control switch flag. Further, the turning instruction angle switch unit 60 outputs the information signal including the SBW turning instruction angle to the turning position servo controller 48. Moreover, the turning position servo controller 48 that has received an input of the information signal including the SBW turning instruction angle changes the voltage to be supplied to the turning motor 2, so that the turning motor instruction current according to the SBW turning instruction angle should be input to the turning motor 2.

As described heretofore, in the present embodiment, the turning motor controller 18 corrects the turning instruction angle to calculate the turning torque depending on the target turning angle by use of a predefined turning assistance torque calculation gain, so as to calculate the turning assistance torque. Accordingly, when the turning control switch flag is switched from the "EPS state" to the "SBW state", the turning position servo controller 48 will change the voltage to be supplied to the turning motor 2 according to the turning instruction angle that is not corrected by the turning assistance torque calculation gain. Accordingly, in the present embodiment, when the turning control switch flag is switched from the "EPS state" to the "SBW state", it is possible for the turning position servo controller 48 to continue the servo control of the turning angle.

(Advantageous Effects of the Second Embodiment)

According to the vehicle control apparatus 1 in the present embodiment, following advantageous effects will be brought about.

(1) The turning motor controller 18 corrects the turning instruction angle to calculate the turning torque depending on the target turning angle, by use of a predefined turning assistance torque calculation gain, so as to calculate the turning assistance torque. Accordingly, when the turning control switch flag is switched from the "EPS state" to the "SBW state", the turning position servo controller 48 changes the voltage to be supplied to the turning motor 2 in accordance with the turning instruction angle that is not corrected by the turning assistance torque calculation gain.

As a result, when the turning control switch flag is switched the "EPS state" to the "SBW state", it is possible for the turning position servo controller 48 to continue the servo control of the turning angle, and it is thus possible to smoothly shift from the EPS state to the SBW state. Accordingly, it is possible to reduce a sense of discomfort that a driver feels when the backup clutch 6 in the engagement state is switched to the release state.

Herein, only a limited number of the embodiments have been described. The scope of right of the present disclosure is not limited to the above-described embodiments. It would be apparent by those skilled in the art that changes may be made in these embodiments, based on the above disclosure.

The invention claimed is:

1. A vehicle steering control apparatus, comprising:
  a driving source configured to drive a driving wheel;
  a turning motor configured to turn a turning wheel;
  a backup clutch configured to be switchable between a release state of mechanically decoupling a torque transmission path between a steering operation element operated by a driver and the turning wheel and an engagement state of mechanically coupling the torque transmission path;
  a steering torque detector configured to detect a steering torque to be applied to a steering shaft included in the torque transmission path, when the driver operates the steering operation element;
  a clutch controller configured to set the backup clutch to the engagement state at a time when starting the driving source, and to switch the backup clutch in the engagement state to the release state when the steering torque detected by the steering torque detector after the driving source starts becomes equal to or lower than a clutch release start torque that is set beforehand, and to determine that shifting from the engagement state of the backup clutch to the release state is completed, when the steering torque detected by the steering torque detector is equal to or lower than a predefined clutch release estimate torque which is lower than the clutch release start torque, and when an elapsed time while the steering torque is equal to or lower than the predefined clutch release estimate torque is equal to or longer than a predefined SBW switch determination time, by which it is estimated that the backup clutch is completely shifted to the release state after switching of the engagement state of the backup clutch to the release state starts; and
  a turning motor controller configured to make the turning motor output a turning assistance torque for assisting turning of the turning wheel in response to an operation of the steering operation element, when the clutch controller sets the backup clutch to the engagement state, and configured to make the turning motor output the turning torque depending on a target turning angle in response to the operation of the steering operation element, when the clutch controller switches the backup clutch in the engagement state to the release state,
  wherein the turning motor controller is configured to make the turning motor output the turning assistance torque for assisting the turning of the turning wheel in response to the operation of the steering operation element until the clutch controller determines that the shifting from the engagement state of the backup clutch to the release state is completed, and to output the turning torque depending on the target turning angle to control driving of the turning motor, when the clutch controller determines that the shifting from the engagement state of the backup clutch to the release state is completed.

2. The vehicle steering control apparatus according to claim 1, wherein the turning motor controller is configured to set the backup clutch to the engagement state in starting the driving source, and is configured to set the turning assistance torque output from the turning motor to have a value so that the steering torque becomes equal to or lower than the clutch release start torque.

3. The vehicle steering control apparatus according to claim 1, wherein the turning motor controller is configured to set the backup clutch to the engagement state in starting the driving source, and is configured to set the backup clutch to the engagement state when a failure occurs at the vehicle steering control apparatus and set the turning assistance torque output from the turning motor to have a torque greater than the turning assistance torque output from the turning motor.

4. The vehicle steering control apparatus according to claim 1, further comprising:
  a reaction force motor configured to output to the steering shaft a steering reaction force to be exerted in an opposite direction to an operation direction of the steering operation element to be steered by the driver; and
  a reaction force motor controller configured to output the steering reaction force to the steering shaft to control driving of the reaction force motor, after a state where the backup clutch is set to the engagement state and the turning motor outputs the turning assistance torque, until a state where the backup clutch in the engagement state is switched to the release state.

5. The vehicle steering control apparatus according to claim 1, wherein the turning motor controller is configured to correct a turning instruction angle for calculating the turning torque depending on the target turning angle by use of a predefined turning assistance torque calculation gain to calculate the turning assistance torque.

6. The vehicle steering control apparatus according to claim 1, wherein the clutch controller is configured to determine that shifting from the engagement state of the backup clutch to the release state is completed, when the steering torque detected by the steering torque detector becomes equal to or lower than the clutch release estimate torque, after switching of the engagement state of the backup clutch to the release state starts, and
  wherein the backup clutch in the release state is switched to the engagement state, when the steering torque detected by the steering torque detector is greater than the clutch release estimate torque, until the elapsed time for determination becomes equal to or longer than the SBW switch determination time.

7. A vehicle steering control method, comprising:
  detecting a steering torque to be applied to a steering shaft included in a torque transmission path between a steering operation element and a turning wheel, when a driver operates the steering operation element;
  setting a backup clutch configured to be switchable between a release state of mechanically decoupling the torque transmission path and an engagement state of mechanically coupling the torque transmission path, to the engagement state at a time when starting the driving source for driving a steering wheel;
  switching the backup clutch in the engagement state to the release state when the steering torque detected after the driving source starts becomes equal to or lower than a clutch release start torque that is set beforehand;

determining that shifting from the engagement state of the backup clutch to the release state is completed, when the steering torque detected is equal to or lower than a predefined clutch release estimate torque which is lower than the clutch release start torque, and when an elapsed time while the steering torque is equal to or lower than the predefined clutch release estimate torque is equal to or longer than a predefined SBW switch determination time, by which it is estimated that the backup clutch is completely shifted to the release state after switching of the engagement state of the backup clutch to the release state starts; and making the turning motor output a turning assistance torque for assisting turning of the turning wheel in response to an operation of the steering operation element, when the backup clutch is set to the engagement state, and making the turning motor output the turning torque depending on a target turning angle in response to the operation of the steering operation element, when the backup clutch in the engagement state is switched to the release state, wherein the turning motor is made to output the turning assistance torque for assisting the turning of the turning wheel in response to the operation of the steering operation element, until it is determined that the shifting from the engagement state of the backup clutch to the release state is completed, and the turning torque is output depending on the target turning angle to control driving of the turning motor, when it is determined that the shifting from the engagement state of the backup clutch to the release state is completed.

* * * * *